US012388292B2

(12) United States Patent
Roni-Damond et al.

(10) Patent No.: US 12,388,292 B2
(45) Date of Patent: Aug. 12, 2025

(54) METHOD FOR MANAGING THE ELECTRIC POWER SUPPLY OF A CRANE FROM A PRIMARY SOURCE AND FROM A RECHARGEABLE SECONDARY SOURCE

(71) Applicant: MANITOWOC CRANE GROUP FRANCE, Dardilly (FR)

(72) Inventors: Bruno Roni-Damond, Lyons (FR); Vincent Veillerot, Tassin la Demi Lune (FR)

(73) Assignee: Manitowoc Crane Group France, Dardilly (FR)

( * ) Notice: Subject to any disclaimer, the term of this patent is extended or adjusted under 35 U.S.C. 154(b) by 0 days.

(21) Appl. No.: 18/539,686

(22) Filed: Dec. 14, 2023

(65) Prior Publication Data

US 2024/0113554 A1    Apr. 4, 2024

Related U.S. Application Data

(63) Continuation of application No. 17/692,120, filed on Mar. 10, 2022, now Pat. No. 11,916,433.

(30) Foreign Application Priority Data

Mar. 10, 2021    (FR) ..................... 21/02360

(51) Int. Cl.
*H02J 9/06*    (2006.01)
*B66C 13/12*    (2006.01)
(Continued)

(52) U.S. Cl.
CPC .............. *H02J 9/062* (2013.01); *B66C 13/12* (2013.01); *B66C 13/18* (2013.01); *H02J 7/0048* (2020.01);
(Continued)

(58) Field of Classification Search
CPC ......... B66C 13/12; B66C 13/22; B66C 13/18; B66C 13/28; B66C 13/26; H02J 7/0068;
(Continued)

(56) References Cited

U.S. PATENT DOCUMENTS 11,916,433 B2 *    2/2024    Roni-Damond ...... H02J 7/0068
2015/0130375 A1    5/2015    Sutherland
2016/0297308 A1    10/2016    Schmidt

FOREIGN PATENT DOCUMENTS

CN    202004500 U    10/2011
CN    104555742 A    4/2015
(Continued)

OTHER PUBLICATIONS

Search Report issued in connection with FR Pat. Appl. 21/02360, dated Nov. 23, 2021.

*Primary Examiner* — Ryan Johnson
(74) *Attorney, Agent, or Firm* — Cook Alex Ltd.

(57) ABSTRACT

An electric power supply management method is configured to electrically power electrical equipment of a crane, via a conversion circuit, from a primary power supply source capable of providing a primary power and from a rechargeable secondary power supply source capable of providing a secondary power. The electric power supply management method includes monitoring of a requested general power which corresponds to a power demanded by all the electrical equipment, and a monitoring of a charge level of the rechargeable secondary power supply source.

24 Claims, 5 Drawing Sheets

(51) Int. Cl.
*B66C 13/18* (2006.01)
*H02J 7/00* (2006.01)
*H02J 7/02* (2016.01)

(52) U.S. Cl.
CPC .......... *H02J 7/0063* (2013.01); *H02J 7/0068* (2013.01); *H02J 7/02* (2013.01)

(58) Field of Classification Search
CPC ............. H02J 7/34; H02J 7/02; H02J 7/0048; Y02T 10/70; Y02T 10/64; B60L 2200/40
See application file for complete search history.

(56) References Cited

FOREIGN PATENT DOCUMENTS

| | | | |
|---|---|---|---|
| CN | 108712847 | A | 10/2018 |
| CN | 110963412 | A | 4/2020 |
| CN | 111927759 | A | 11/2020 |
| DE | 102017107309 | A1 | 10/2018 |
| EP | 1927570 | A1 | 6/2008 |
| EP | 1967486 | A1 | 9/2008 |
| WO | 2012084508 | A2 | 6/2012 |
| WO | 2012098699 | A1 | 7/2012 |
| WO | 2013001674 | A1 | 1/2013 |
| WO | 2015032320 | A1 | 3/2015 |

\* cited by examiner

METHOD FOR MANAGING THE ELECTRIC POWER SUPPLY OF A CRANE FROM A PRIMARY SOURCE AND FROM A RECHARGEABLE SECONDARY SOURCE

CROSS-REFERENCE TO RELATED APPLICATIONS

This application is a continuation of U.S. patent application Ser. No. 17/692,120 filed Mar. 10, 2022, which claims priority to and the benefit of French Patent Application No. 21/02360 filed Mar. 10, 2021, the contents of each of which are incorporated by reference herein in their entireties.

FIELD

The present invention concerns a management method for managing electrical power supply for electrically powering electrical equipment of a crane, from a primary power supply source such as the mains grid (or electrical network) and from a rechargeable secondary power supply source such as a battery via a conversion circuit, as well as a crane implementing this management method.

BACKGROUND

The power supply power supplied by an electrical energy source to power a crane is often limited. The electrical energy source could even not be present in the proximity of the crane, in particular during the installation of the crane on a construction site. This is the case in particular for automated mounting cranes (or self erecting cranes) designed for small construction or renovation sites, and for which the electrical energy source available on the construction site, which could refer to the mains grid or a genset for example, could supply different electric voltage values for example a 400V three-phase voltage, a 230V single-phase voltage with an electric current of 20 A or 32 A.

Thus, to be able to power the crane, a user of the crane is constrained to size the electrical energy source while taking into account the minimum electrical energy need of the crane.

The cost for providing an adequate electric power supply source is proportional to the requested power supply and considerably increases if the crane requires the installation of a new electrical network capable of providing a greater power supply or if the crane requires a use of a genset.

A known solution for limiting the cost due to the power supply source of a crane is to reduce the minimum need for electric power supply of the crane by reducing its performance, in general by selecting a smaller lifting winch requiring a lower electric current to operate. In this case, the decrease in performance and productivity is considerable for the crane.

Another solution consists in adding to the primary power supply source a rechargeable auxiliary or secondary power supply source to increase the power supplied to the crane.

Thus, it is known to implement an electric power supply management method to electrically power electrical equipment of a crane from a primary power supply source capable of providing a primary power and from a rechargeable secondary power supply source capable of providing a secondary power via a conversion circuit. For example, the document CN202004500U proposes the use, for a lifting device such as a crane, of a rechargeable secondary power supply source, in other words an autonomous power supply source with batteries, and with a converter, and mentions a backup power supply function in the event of failure of the primary power supply source.

The document CN110963412A also proposes the use of an autonomous source with batteries and a converter, and mentions a hybrid power supply mode in which the primary power supply source and the rechargeable secondary power supply source are both connected to the electrical equipment of a crane to electrically power them.

These arrangements are satisfactory to the extent that it becomes possible to supply a complementary power supply and to ensure a power supply backup in the event of a cutoff or failure of the primary power supply source.

Nonetheless, the existing electric power supply management methods do not enable an automatic control of a distribution of power originating from the primary power supply source when the power supply demand of the electrical equipment of the crane exceeds a maximum power threshold available by the primary power supply source.

SUMMARY

The present invention aims at solving all or part of the above-mentioned drawbacks.

The technical problem at the origin of the invention consists in particular in implementing a management method for managing electrical power supply to electrically power electrical equipment of a crane remarkable in that said method comprises a monitoring of a requested general power that corresponds to a power demanded by all electrical equipment, and a monitoring of a charge level of the rechargeable secondary power supply source, and to provide the crane for which this management method is implemented which has a simple and economic structure.

To this end, the present invention relates to an electric power supply management method for electrically powering electrical equipment of a crane, via a conversion circuit, from a primary power supply source capable of providing a primary power and from a rechargeable secondary power supply source capable of providing a secondary power according to the aforementioned type, remarkable in that it comprises a monitoring of a requested general power which corresponds to a power requested by all the electrical equipment and a monitoring of a charge level of the rechargeable secondary power supply source, and wherein the electric power supply management method implements, depending on said requested general power and said charge level, at least the following management modes:

a recharging mode in which the requested general power is zero and the primary power supply source is available and connected to the rechargeable secondary power supply source to recharge it according to its charge level;

a mixed recharging/powering mode in which the requested general power is non-zero, and the primary power supply source is available and connected, on the one hand, to the electrical equipment to electrically power them and, on the other hand, to the rechargeable secondary power supply source to recharge it depending on the charge level;

a main power supply mode in which the requested general power is non-zero, and only the primary power supply source is connected to the electrical equipment to electrically power them;

a hybrid power supply mode in which the requested general power is non-zero, and the primary power supply source and the rechargeable secondary power supply source are both connected to the electrical equipment to electrically power them; and an autonomous power supply mode in which the requested general power is non-zero, and only the rechargeable secondary power supply source is connected to the electrical equipment to electrically power them according to the charge level.

For example, the primary power supply source may refer to the mains grid (also called electrical network) and/or a genset, and the rechargeable secondary power supply source may refer to one rechargeable battery or several rechargeable batteries.

Moreover, in the management method according to the invention, the electrical equipment are powered by an available maximum power which corresponds to a minimum between a maximum conversion power and a source power, wherein the maximum conversion power corresponds to a maximum power that can be delivered at the output of the conversion circuit and wherein the source power corresponds to:

the sum of the secondary power and of the primary power in the hybrid power supply mode;

the secondary power in the autonomous power supply mode;

the primary power in the main power supply mode; and the primary power minus a recharging power used to recharge the rechargeable secondary power supply source in the mixed recharging/powering mode;

and wherein the electric power supply management method implements, in the autonomous power supply mode and in the hybrid power supply mode, an adaptation of the secondary power as a function at least of the charge level, said secondary power being lower than or equal to a secondary maximum power which corresponds to a maximum power that can be delivered by the rechargeable secondary power supply source.

Thus, the invention proposes to adapt the secondary power supplied by the rechargeable secondary power source as a function of its charge level, thus making it possible to improve, or even save, the management of the electrical energy coming from this rechargeable secondary power supply source.

Advantageously, the management method implements a selection, in the hybrid power supply mode and in the autonomous power supply mode, of a management sub-mode amongst several management sub-modes comprising at least:

an automatic sub-mode in which the secondary power is monitored so as to correspond to ka times the secondary maximum power, wherein ka is a coefficient that is less than or equal to 1 and which decreases with the charge level until the charge level drops below a low threshold;

an economical sub-mode in which the secondary power is monitored so as to correspond to ke times the secondary maximum power, wherein ke is a coefficient lower than ka and which decreases with the charge level until the charge level drops below a low threshold.

In the described electric power supply management method and according to one implementation:

in the automatic sub-mode, the coefficient ka is equal to kamax as long as the charge level of the rechargeable secondary power supply source is above a high threshold, then the coefficient ka is equal to kamin when the charge level is comprised between the low threshold and the high threshold, and finally the coefficient ka is zero when the charge level of the rechargeable secondary power supply source is below the low threshold, wherein kamax is higher than kamin; and in the economical sub-mode, the coefficient ke is equal to kemax as long as the charge level of the rechargeable secondary power supply source is above the high threshold, then the coefficient ke is equal to kemin when the charge level of the rechargeable secondary power supply source is comprised between the low threshold and the high threshold, and finally the coefficient ke is zero when the charge level of the rechargeable secondary power supply source is below the low threshold, wherein kemax is higher than kemin, kamax is higher than kemax and kamin is higher than kemin.

According to one possibility, kamax is comprised between 0.8 and 1, kamin is comprised between 0.5 and 0.7, kemax is comprised between 0.6 and 0.8 and kemin is comprised between 0.2 and 0.4.

The low threshold is comprised between 5 and 15% of a charge capacity of the rechargeable secondary power supply source and the high threshold is comprised between 40 and 60% of a charge capacity of the rechargeable secondary power supply source.

In the autonomous power supply mode and whether in the automatic sub-mode or in the economical sub-mode, the electric power supply management method may automatically switch into a standby mode after the charge level of the rechargeable secondary power supply source drops below the low threshold, wherein in the standby mode only predefined safety equipment amongst the electrical equipment are powered to allow the crane to be safe-guarded, and for example to be placed in a weather vane state.

In the standby mode, the secondary power may be monitored to match the secondary maximum power in order to power the safety equipment at least while safeguarding the crane.

According to one possibility, the management sub-modes also comprise an extreme sub-mode in which the secondary power corresponds to the secondary maximum power regardless of the value of the charge level of the rechargeable secondary power supply source.

In the extreme sub-mode, when the charge level of the rechargeable secondary power supply source drops below the low threshold, then only the safety equipment may be powered to allow the crane to be safe-guarded (or placed in a weather vane state).

An allocation method for allocating the available maximum power over the different electrical equipment may be implemented, regardless of the management mode amongst the hybrid power supply mode, the autonomous power supply mode, the main power supply mode and the mixed recharging/powering mode.

According to one possibility, the allocation method comprises a step of selecting between:

a raw mode in which the available maximum power is allocated over predefined actuation equipment and over predefined accessory equipment among the electrical equipment, the actuation equipment are defined according to a configuration of the crane; and an optimized mode in which the available maximum power is allocated over the predefined actuation equipment and also over the accessory equipment but according to cutoff conditions associated to the accessory equipment, so that according to their respective cut-off conditions the accessory equipment are powered or not.

Thus, this allocation method proposes to make a distinction between:
- the actuation equipment which are the equipment suitable for actuating a movement of the crane or of a component of the crane, and in particular for the assembly/dismantling of the crane and for the movement of a load; and
- the accessory equipment which are equipment that are not actuation equipment, in other words equipment that do not participate in the movement of the crane or of a component of the crane.

Electrical equipment includes actuation equipment and accessory equipment.

The invention then proposes to select between:
- the raw mode in which the available maximum power is allocated over the actuation equipment and the accessory equipment, without distinction between the actuation equipment and the accessory equipment, as long as the electrical equipment is in demand for electrical power; and
- the optimized mode in which the available maximum power is allocated over the actuation equipment, and also over the accessory equipment, but only according to breaking conditions.

If, for an accessory equipment, its cut-off condition is fulfilled for a cutting-off of the accessory equipment, then in the optimized mode this accessory equipment will not be electrically powered. On the other hand, if for an accessory equipment, its cut-off condition is not fulfilled for a cutting-off of the accessory equipment, then in the optimized mode this accessory equipment will be electrically supplied. In the optimized mode, on the other hand, there is no cut-off condition for the actuation equipment, which therefore have priority.

The actuation equipment may comprise mounting equipment which participate in a mounting of the crane by acting on a displacement of part(s) of the crane when the crane is in a mounting configuration.

The actuation equipment may comprise working equipment which participate in displacing a load when the crane is in a working configuration.

The mounting equipment may comprise at least one of the following equipment: a hydraulic folding/unfolding unit allowing folding/unfolding of a mast and of a jib, a hydraulic wedging unit allowing to wedge the crane on a ground, a hydraulic orientation unit allowing an orientation of a base of the crane, a bracket hydraulic unit allowing actuation of a mounting bracket.

The working equipment may comprise at least one of the following equipment: a motorized lifting system allowing to lift/lower a load, a motorized distribution system allowing a distribution of a load along a jib, an orientation motorized system allowing an orientation of a jib, a translation motorized system allowing a translation of the crane, a motorized lifting system allowing a lifting of a luffing jib.

The accessory equipment may comprise at least one of the following system accessory equipment: a heating system to heat up a space of the crane, a ventilation or cooling system to ventilate/cool down a space of the crane; and the cutoff conditions depend on at least one environmental parameter that is a physical parameter representative of the space of the crane.

Thus, among the accessory equipment, there are one or more system accessory equipment associated with space(s) of the crane and which, in the optimized mode, will be cut or not depending at least on the environmental parameter associated with the corresponding space.

The environmental parameter may be an internal temperature of the space of the crane.

According to one possibility, the space of the crane is an electrical cabinet internally grouping all or part of the organs participating in the electrical power supply of the crane, or a cockpit.

The accessory equipment may comprise at least one of the following user accessory equipment: a lighting system, an electrical socket; and the cutoff conditions depend on a selection of a classification performed by a user for the or each of the user accessory equipment, amongst the following classifications:
- a "non-essential" classification which corresponds to an authorization not to power the corresponding user accessory equipment in the optimized mode in favor of the actuation equipment; and
- an "essential" classification which corresponds to a prohibition not to power the corresponding user accessory equipment in the optimized mode.

Thus, among the accessory equipment, there are the user accessory equipment, which are themselves divided into two classes, a "non-essential" class and an "essential" class.

In the optimized mode, the actuation equipment may be powered by an actuation power that is equivalent to the available maximum power or to the available maximum power minus an accessory power necessary to power the accessory equipment according to the cutoff conditions,
- and this actuation power is allocated over the actuation equipment according to an allocation scheme selected amongst the following two allocation schemes:
  - a first scheme in which the actuation equipment are sequentially activated and therefore sequentially powered, so that each actuation equipment is powered, when activated, by the actuation power; and
  - a second scheme in which the actuation equipment are simultaneously activated and therefore simultaneously powered, so that all of the actuation equipment are powered together by the actuation power.

According to one possibility, a storage in a memory of a plurality of preferential allocation modes may be implemented, each preferential allocation mode being associated with percentages of allocation of the actuation power over the different actuation equipment in the second scheme, and the management method implements a selection of a preferential allocation mode to provide an allocation of the actuation power in accordance with said selected preferential allocation mode when the second scheme is selected.

When the requested general power is non-zero, the following management modes may be automatically implemented:
- the autonomous power supply mode is automatically implemented if the primary power supply source is not available;
- the main power supply mode or the mixed recharging/powering mode is automatically implemented according to the charge level of the rechargeable secondary power supply source, if the primary power supply source is available and if the requested general power is lower than the primary power;
- the hybrid power supply mode is automatically implemented if the primary power supply source is available and if the requested general power is higher than the primary power.

The primary power supply source may output a single-phase or three-phase type primary power supply voltage, for example at 230 or 400 volts, and the conversion circuit ensures a conversion of said primary power supply voltage into a three-phase power supply voltage.

The present invention also relates to a crane comprising electrical equipment electrically powered, via a conversion circuit, by a primary power supply source capable of providing a primary power and a rechargeable secondary power supply source capable of providing a secondary power remarkable in that said crane comprises a unit for supervising a requested general power which corresponds to a power demanded by all the electrical equipment and a charge level of the rechargeable secondary power supply source, and in that it comprises a control/command unit, connected to the monitoring unit and to the conversion circuit, and configured to implement the management method in accordance with the invention.

In the crane, the electrical equipment may comprise safety equipment configured to allow the crane to be safe-guarded, namely to place the crane in a weather vane state with its jib free to rotate to be aligned with the wind.

The electrical equipment may comprise accessory equipment such as for example a heating system to heat up a space of the crane, a ventilation or cooling system for ventilating/cool down a space of the crane, a lighting system, an electrical socket.

According to one possibility, the electrical equipment may comprise actuation equipment, and said actuation equipment comprises working equipment which participate in displacing a load when the crane is in a working configuration.

The actuation equipment may comprise mounting equipment which participate in a mounting of the crane by acting on a displacement of part(s) of the crane when the crane (CR) is in a mounting configuration.

The crane may further comprise a user interface connected to the control/command unit to select, in the hybrid power supply mode, in the autonomous power supply mode, in the main power supply mode and in the mixed recharging/powering mode, a management sub-mode amongst several management sub-modes of the management method as described above.

The conversion circuit may be an AC/AC electrical converter comprising a rectifier and an inverter.

According to one embodiment, the conversion circuit comprises at least one frequency converter.

The conversion circuit may also comprise an electrical component intended to raise the value of the electric signal such as for example an electrical transformer.

The monitoring unit may be a microcontroller.

According to one embodiment, the monitoring unit selects the power supply source amongst the primary power supply source and the rechargeable secondary power supply source thanks to turning ON/OFF of an electrical switch.

The power supply voltage may have an effective value of 230V and the three-phase power supply voltage an effective value of 400V for example.

In a particular embodiment of the crane, the electrical equipment comprises actuation equipment defined according to a configuration of the crane and accessory equipment, and the control/command unit is configured for the implementation of the method of distribution described above, said control/command unit being connected, on the one hand, to an interface allowing a selection between the raw mode and the optimized mode and, on the other hand, to an electrical circuit connecting the source of primary power supply and the rechargeable secondary power source to the electrical equipment to control a distribution of the maximum power available according to the mode selected from the raw mode and the optimized mode.

BRIEF DESCRIPTION OF THE DRAWINGS

The invention will be better understood using the detailed description which is exposed below with regard to the appended drawings in which.

DESCRIPTION

In the detailed description which will follow of the figures defined above, the same elements or the elements performing identical functions may retain the same references so as to simplify the understanding of the invention.

The first part of the following description relates to the implementation of a management method «POWER MANAGEMENT» for managing electrical power supply to electrically power electrical equipment 9 of a crane CR, via a conversion circuit Q, from two power supply sources:

a primary power supply source PRIM (also called primary source), such as for example an electrical network and/or a generating unit, which is capable of providing a primary power PRPOW, and a rechargeable secondary power supply source SEC (also called rechargeable secondary source or secondary source), such as for example one or more rechargeable batteries, which is capable of providing a secondary power SECPOW.

Figure 4:
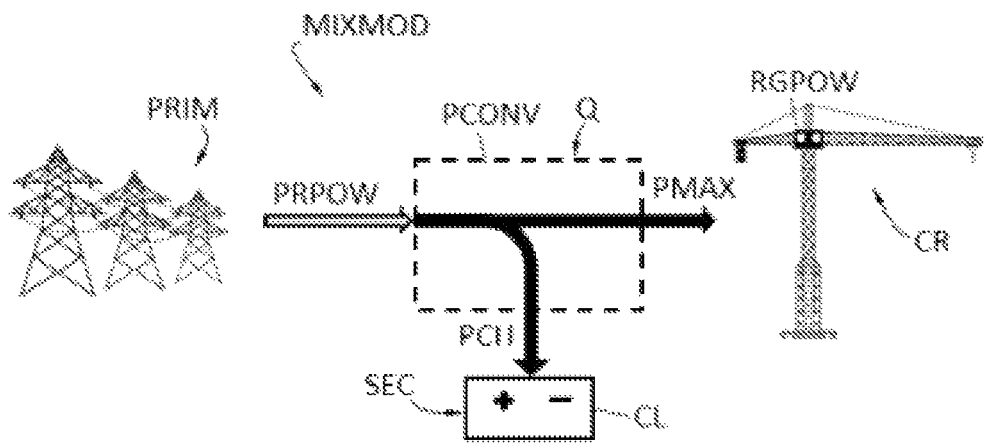
FIG. 4 is a schematic representation of a fourth power supply management mode to electrically power the electrical equipment of the crane, called a mixed recharging/powering mode.
Figure 5:
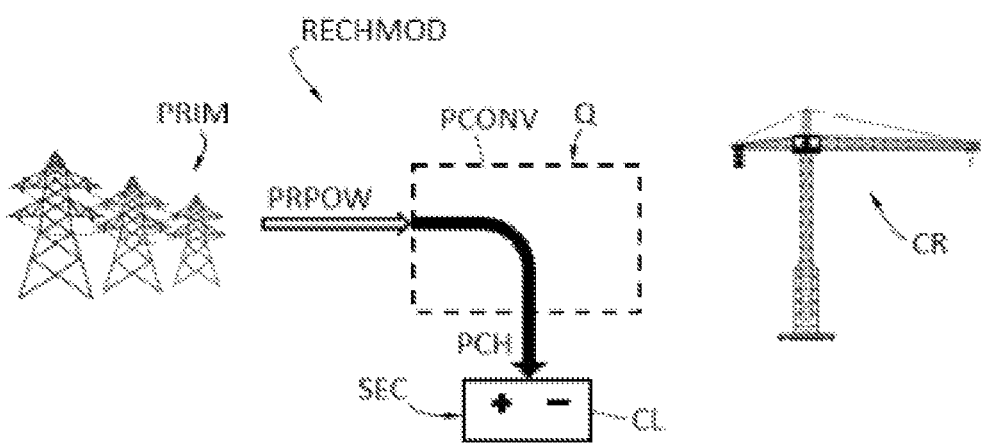
FIG. 5 is a schematic representation of a fifth power supply management mode to electrically power the electrical equipment of the crane, called the recharging mode.
Figure 6:
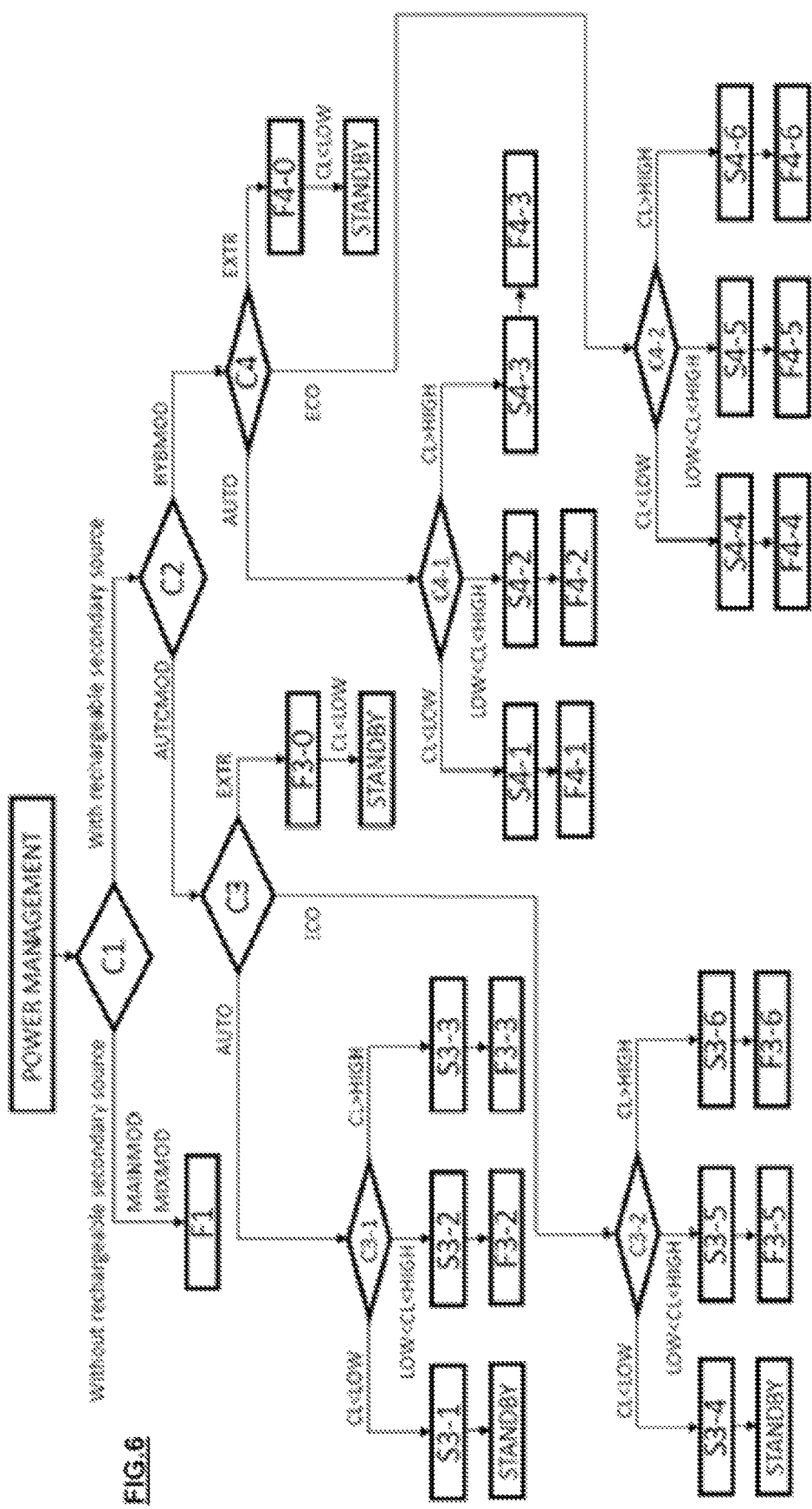
FIG. 6 is a flowchart showing the different steps to be performed when implementing a management method for managing electrical power supply to electrically power the electrical equipment of the crane.

The implementation of the steps of this management method «POWER MANAGEMENT» is shown in FIG. 6 and its management modes are represented in FIGS. 1 to 5.

This management method «POWER MANAGEMENT» implements two monitoring steps which are:

monitoring of a requested general power RGPOW which corresponds to a power requested by all the electrical equipment 9 of the crane CR, and monitoring of a charge level CL of the rechargeable secondary power supply source SEC.

Figure 1:
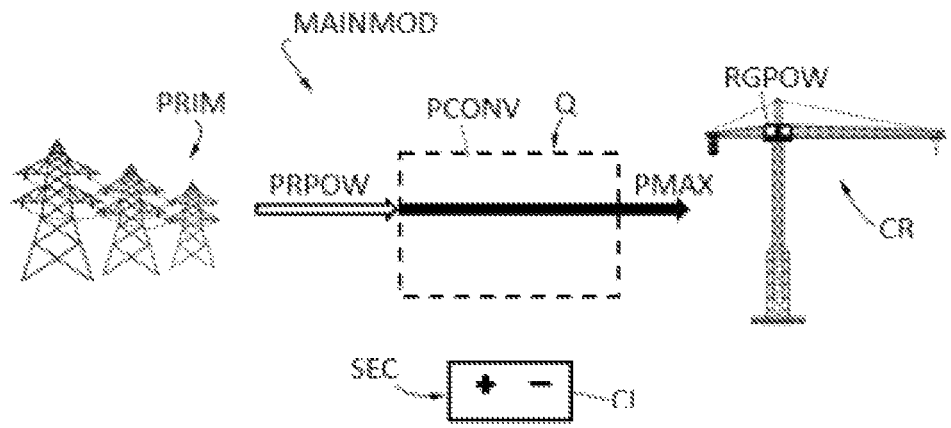
FIG. 1 is a schematic representation of a power supply management mode to electrically power electrical equipment of a crane called main power supply mode.
Figure 2:
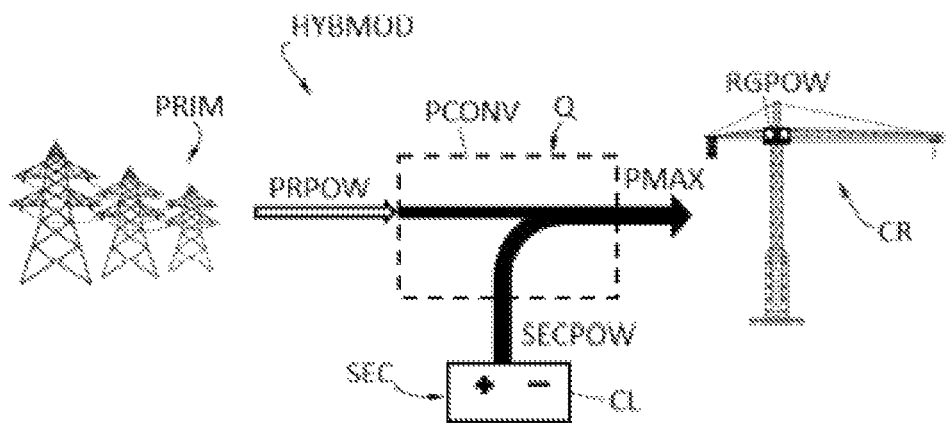
FIG. 2 is a schematic representation of a second power supply management mode to electrically power the electrical equipment of the crane, called hybrid mode.
Figure 3:
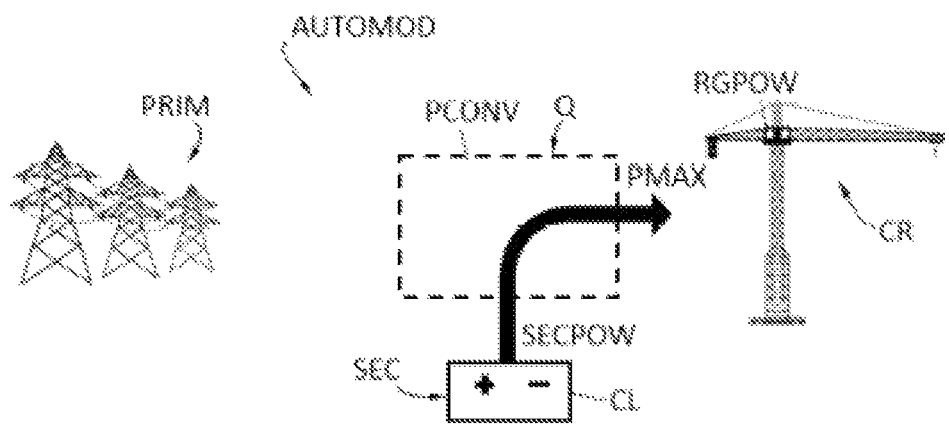
FIG. 3 is a schematic representation of a third power supply management mode to electrically power the electrical equipment of the crane called autonomous mode.

In addition, this management method «POWER MANAGEMENT» implements, depending on the requested general power RGPOW and the charge level CL, at least the following management modes:
- a recharging mode RECHMOD shown in FIG. 5 in which the requested general power RGPOW is zero and the primary power supply source PRIM is available and connected to the rechargeable secondary power supply source SEC to recharge it according to its charge level CL;
- a mixed recharging/powering mode MIXMOD presented in FIG. 4 in which the requested general power RGPOW is non-zero, and the primary power supply source PRIM is available and connected, on the one hand, to the electrical equipment 9 of the crane CR to electrically power them and, on the other hand, to the rechargeable secondary power supply source SEC to recharge it according to the charge level CL;
- a main power supply mode MAINMOD presented in FIG. 1 in which the requested general power RGPOW is non-zero, and only the primary power supply source PRIM is connected to the electrical equipment 9 of the crane CR to electrically power them;
- a hybrid power supply mode HYBMOD shown in FIG. 2 in which the requested general power RGPOW is non-zero, and the primary power supply source PRIM and the rechargeable secondary power supply source SEC are both connected to the electrical equipment 9 of the crane CR to electrically power them; and
- an autonomous power supply mode AUTOMOD presented in FIG. 3 in which the requested general power RGPOW is non-zero, and only the rechargeable secondary power supply source SEC is connected to the electrical equipment 9 of the crane CR to electrically power them according (or depending) to the charge level CL.

In the management method «POWER MANAGEMENT», the electrical equipment 9 are powered with an available maximum power PMAX which corresponds to the minimum between a maximum conversion power PCONV and a source power PS, wherein the maximum conversion power PCONV corresponds to a maximum power that can be delivered at the output of a conversion circuit Q.

The source power PS depends on the management mode, and it corresponds to:
- the sum of the secondary power SECPOW and the primary power PRPOW in the hybrid power supply mode HYBMOD of FIG. 2;
- the secondary power SECPOW in the autonomous power supply mode AUTOMOD in FIG. 3;
- the primary power PR POW in the main power supply mode MAINMOD of FIG. 1; and
- the primary power PRPOW minus a recharging power PCH used to recharge the rechargeable secondary power supply source SEC in the mixed recharging/powering mode MIXMOD of FIG. 4.

Moreover, the management method «POWER MANAGEMENT» implements, in the autonomous power supply mode AUTOMOD and in the hybrid power supply mode HYBMOD, an adaptation of the secondary power SECPOW as a function of at least the charge level CL, said secondary power SECPOW being less than or equal to a maximum secondary power SECPOWMAX which corresponds to a maximum power that can be delivered by the rechargeable secondary power supply source SEC.

Thus, and with reference to FIG. 6, the management method «POWER MANAGEMENT» begins with a step of selecting a power supply C1, or «POWER SUPPLY» step, during which a selection or deselection of the rechargeable secondary source SEC to power the electrical equipment 9 of the crane CR. In other words, this power supply step C1 operates a selection of the power with or without the rechargeable secondary source SEC. Thus, at the end of the power supply step C1, the rechargeable secondary source SEC is:
- either connected to the electrical equipment 9 of the crane CR to participate in their electrical power supply, which leads to the hybrid power supply mode HYBMOD or to the autonomous power supply mode AUTOMOD;
- either disconnected from the electrical equipment 9 of the crane CR so as not to take part in their electrical power supply, which leads to the main power supply mode MAINMOD or to the mixed recharging/powering mode MMEXT.

If, at the end of the power supply step C1, the rechargeable secondary source SEC is disconnected, then it is the main power supply mode MAINMOD or the mixed recharging/powering mode MIXMOD which is selected, and it is followed by the execution of a step F1, or «POWER ALLOCATION» step, to initiate an allocation method «POWER ALLOCATION» (described below) for allocating the available maximum power PMAX. As a reminder, the available maximum power PMAX corresponds to:
- in the main power supply mode MAINMOD, at least between the maximum conversion power PCONV and the primary power PRPOW; and
- in the mixed recharging/powering mode MIXMOD, at least between the maximum conversion power PCONV and the primary power PRPOW minus the recharging power PCH.

If, however, at the end of the power supply step C1, the rechargeable secondary source SEC is connected (that is to say that the power supply will use the rechargeable secondary source SEC), then it is followed by the execution of a step of selecting a mode C2, or «MODE SELECTION» step, which consists in selecting between the hybrid power supply mode HYBMOD and the autonomous power supply mode AUTOMOD.

This POWER SUPPLY step C1 followed by this mode selection step C2 thus leads to selecting the management mode. Depending on various parameters, and in particular the requested general power RGPOW, the availability of the primary power supply source PRIM and the primary power PRPOW, these selection steps C1, C2 can operate automatically for the management mode selection.

Thus, when the requested general power RGPOW is non-zero, the following management modes can be automatically implemented or selected (during the two successive selection steps C1, C2):
- the autonomous power supply mode AUTOMOD is automatically implemented (or selected) if the primary power supply source PRIM is not available;
- the main power supply mode MAINMOD or the mixed recharging/powering mode MIXMOD is automatically implemented (or selected) according to the charge level CL of the rechargeable secondary power supply source SEC, if the primary power supply source PRIM is available and if the requested general power RGPOW is less than the primary power PRPOW;
- the hybrid power supply mode HYBMOD is automatically implemented (or selected) if the primary power supply source PRIM is available and if the requested general power RGPOW is greater than the primary power PRPOW.

After the mode selection step C2, the management method «POWER MANAGEMENT» implements a selection, in the hybrid power supply mode HYBMOD and in the autonomous power supply mode AUTOMOD, of a management sub-mode among several management sub-modes comprising at least:
- an automatic sub-mode «AUTO» in which the secondary power SECPOW is controlled to correspond to ka times the maximum secondary power SECPOWMAX, wherein ka is a coefficient which is less than or equal to 1 and which decreases with the charge level CL until the charge level CL drops below a low threshold LOW;
- an economical sub-mode «ECO» in which the secondary power SECPOW is controlled to correspond to ke times the secondary maximum power SECPOWMAX, wherein ke is a coefficient less than ka and which decreases with the charge level CL until the charge level CL drops below a low threshold LOW;
- an extreme sub-mode «EXTR» in which the secondary power SECPOW corresponds to the maximum secondary power SECPOWMAX whatever the value of the charge level CL of the rechargeable secondary power supply source SEC.

The low threshold LOW can be comprised between 5 and 15% of a charge capacity of the rechargeable secondary power supply source SEC and a high threshold HIGH can be comprised between 40 and 60% of a charge capacity of the rechargeable secondary power supply source SEC.

With reference to FIG. 6, if the power supply mode selected during the mode selection step C2 is the autonomous power supply mode AUTOMOD, then a step of selecting a sub-mode C3 is executed, or the «SUB-MODE SELECTION» step, in which a selection is made between the automatic sub-mode «AUTO», the economical sub-mode «ECO» and the extreme sub-mode «EXTR».

If the sub-mode selected during the sub-mode selection step C3 is the automatic sub-mode «AUTO», then a step of controlling a charge level C3-1 is executed, or «CHARGE LEVEL CONTROL» step, during which the charge level CL of the rechargeable secondary power supply source SEC is measured and is compared with the low threshold LOW and the high threshold HIGH.

If, during the charge level control step C3-1, the charge level CL of the rechargeable secondary power supply source SEC is lower than the low threshold LOW, then a step S3-1 is executed, or step «KA=0», which sets the coefficient ka to zero, so that the secondary power SECPOW is zero. In other words, if the charge level CL is less than 5 to 15% of the charge capacity, then the rechargeable secondary power supply source SEC is providing no power. At the end of this step S3-1, the management method «POWER MANAGEMENT» automatically switches to a standby mode designated by «STANDBY» in FIG. 6.

If, during the charge level control step C3-1, the charge level CL of the rechargeable secondary power supply source SEC is comprised between the low threshold LOW and the high threshold HIGH, then a step S3-2 is executed, or step «KA=KAMIN», which sets the coefficient ka to a value kamin, kamin being comprised between 0.5 and 0.7. In other words, and for example, if the charge level CL of the battery is 30% of its charge capacity, then the provided secondary power SECPOW is equal to kamin times the secondary maximum power SECPOWMAX, namely SECPOW=kamin.SECPOWMAX. This step S3-2 is followed by a step F3-2, or «POWER ALLOCATION» step, which implements the allocation method «POWER ALLOCATION» for allocating the available maximum power PMAX, wherein the available maximum power PMAX corresponds to the minimum between the power of maximum conversion PCONV and the source power PS which is equivalent to the secondary power SECPOW which is equal to kamin.SECPOWMAX in this automatic sub-mode «AUTO» of the autonomous power supply mode AUTOMOD. These steps S3-2 and F3-2 are executed as long as the charge level CL is comprised between the low threshold LOW and the high threshold HIGH and, if the charge level CL drops below the low threshold LOW, then step S3-1 is executed.

If during the charge level control step C3-1, the charge level CL of the rechargeable secondary power supply source SEC is greater than the high threshold HIGH, then a step S3-3 is executed, or step «KA=KAMAX», which sets the coefficient ka to a value kamax, kamax being greater than kamin and for example comprised between 0.8 and 1. In other words, and for example, if the charge level CL of the battery is 90% of its charge capacity, then the provided secondary power SECPOW is equal to kamax times the secondary maximum power SECPOWMAX, namely SECPOW=kamax.SECPOWMAX. This step S3-3 is followed by a step F3-3, or «POWER ALLOCATION» step, which implements the allocation method «POWER ALLOCATION» for allocating the available maximum power PMAX, wherein the available maximum power PMAX corresponds to the minimum between the maximum conversion power PCONV and the source power PS which is equivalent to the secondary power SECPOW which is equal to kamax.SECPOWMAX in this automatic sub-mode «AUTO» of the autonomous power supply mode AUTOMOD. These steps S3-3 and F3-3 are executed as long as the charge level CL is higher than the high threshold HIGH and, if the charge level CL drops below the high threshold HIGH, then steps S3-2 and F3-2 are executed.

If the sub-mode selected during the sub-mode selection step C3 is the economical sub-mode «ECO», then a step of controlling a charge level C3-2 is executed, or «CHARGE LEVEL CONTROL» step, during which the charge level CL of the rechargeable secondary power supply source SEC is measured and is compared with the low threshold LOW and the high threshold HIGH.

If during the charge level control step C3-2, the charge level CL of the rechargeable secondary power supply source SEC is lower than the low threshold LOW, then a step S3-4 is executed, or step «KE=0», which sets the coefficient ke to zero, so that the secondary power SECPOW is zero. In other words, if the charge level CL is less than 5 to 15% of the charge capacity, then the rechargeable secondary power supply source SEC is providing no power. At the end of this step S3-4, the method «POWER MANAGEMENT» automatically switches to a standby mode designated by «STANDBY» in FIG. 6.

Thus, in the autonomous power supply mode AUTOMOD, and whether in the automatic sub-mode «AUTO» or in the economical sub-mode «ECO», the management method «POWER MANAGEMENT» automatically switches to the standby mode «STANDBY» after the charge level CL of the rechargeable secondary power supply source SEC drops below the low threshold LOW, wherein in this standby mode «STANDBY» only predefined safety equipment among the equipment of the crane CR are powered to allow the crane CR to be safe-guarded, and for example to be placed in a weather vane state. In the standby mode STANDBY, the secondary power SECPOW can be controlled to correspond to the maximum secondary power SECPOWMAX in order to power this safety equipment at least the time the crane CR is safe-guarded, namely placed in a weather vane state.

This safety equipment may comprise equipment which will, for example, allow the jib to be lifted before releasing it in orientation so that it is free to turn with the wind while offering a reduced radius of gyration, the jib is then described as being put in a weather vane state.

If during the charge level control step C3-2, the charge level CL of the rechargeable secondary power supply source SEC is comprised between the low threshold LOW and the high threshold HIGH, then a step S3-5, or step «KE=KEMIN», which sets the coefficient ke to a value kemin, kemin being comprised between 0.2 and 0.4. In other words, and for example, if the charge level CL of the battery is 30% of its charge capacity, then the provided secondary power SECPOW is equal to kemin times the maximum secondary power SECPOWMAX, namely SECPOW=kemin.SECPOWMAX. This step S3-5 is followed by a step F3-5, or «POWER ALLOCATION» step, which implements the allocation method «POWER ALLOCATION» for allocating the available maximum power PMAX, wherein the available maximum power PMAX corresponds to the minimum between the maximum conversion power PCONV and the source power which is equivalent to the secondary power SECPOW which is equal to kemin.SECPOWMAX in this economical sub-mode «ECO» of the autonomous power supply mode AUTOMOD. These steps S3-5 and F3-5 are executed as long as the charge level CL is comprised between the low threshold LOW and the high threshold HIGH and, if the charge level CL drops below the low threshold LOW, then step S3-4 is executed.

If during the charge level control step C3-2, the charge level CL of the rechargeable secondary power supply source SEC is greater than the high threshold HIGH, then a step S3-6 is executed, or step «KE=KEMAX», which sets the coefficient ke to a value kemax, kemax being greater than kemin and kemax being for example comprised between 0.6 and 0.8. In other words, and for example, if the charge level CL of the battery is 90% of its capacity, then the secondary power SECPOW is equal to kemax times the secondary maximum power SECPOWMAX, namely SECPOW=kemax.SECPOWMAX. This step S3-6 is followed by a step F3-6, or «POWER ALLOCATION» step, which implements the allocation method «POWER ALLOCATION» for allocating the available maximum power PMAX, wherein the available maximum power PMAX corresponds to the minimum between the maximum conversion power PCONV and the source power which is equivalent to the secondary power SECPOW which is equal to kemax.SECPOWMAX in this economical sub-mode «ECO» of the autonomous power supply mode AUTOMOD. These steps S3-6 and F3-6 are executed as long as the charge level CL is higher than the high threshold HIGH and, if the charge level CL drops below the high threshold HIGH, then steps S3-5 and F3-5 are executed.

In principle, the value of kemax is greater than that of kemin, and kamax is greater than kemax, and kamin is greater than kemin.

If the sub-mode selected during the sub-mode selection step C3 is the extreme sub-mode «EXTR», then a step F3-0, or «POWER ALLOCATION» step, is executed which implements the allocation method «POWER ALLOCATION» for allocating the available maximum power PMAX, wherein the available maximum power PMAX corresponds to the minimum between the maximum conversion power PCONV and the source power which is equivalent to the secondary power SECPOW which is equal to SECPOWMAX in this extreme sub-mode «EXTR» of the autonomous power supply mode AUTOMOD.

According to one possibility, in the extreme sub-mode «EXTR» in step F3-0, when the charge level CL of the rechargeable secondary power supply source SEC drops below the low threshold LOW then the method «POWER MANAGEMENT» switches automatically in the standby mode «STANDBY» described above, during which only the safety equipment of the crane CR are powered to allow the crane CR to be safe-guarded.

With reference to FIG. 6, if the power supply mode selected during the mode selection step C2 is the hybrid power supply mode HYBMOD, then a sub-mode selection step C4 is executed in which a selection between the automatic sub-mode «AUTO», the economical sub-mode «ECO» and the extreme sub-mode «EXTR» is made.

If the sub-mode selected during the sub-mode selection step C4 is the automatic sub-mode «AUTO», then a charge level control step C4-1 is executed, or «CHARGE LEVEL CONTROL» step, during which the charge level CL of the rechargeable secondary power supply source SEC is measured and is compared with the low threshold LOW and the high threshold HIGH.

If, during the charge level control step C4-1, the charge level CL of the rechargeable secondary power supply source SEC is lower than the low threshold LOW, then a step S4-1 is executed, or step «KA=0», which sets the coefficient ka to zero, so that the secondary power SECPOW is zero. In other words, if the charge level CL is less than 5 to 15% of the charge capacity, then the rechargeable secondary power supply source SEC does not provide any power, and thus the source power PS is entirely provided by the primary power supply source PRIM. This step S4-1 is followed by a step F4-1, or «POWER ALLOCATION» step, which implements the allocation method «POWER ALLOCATION» for allocating the available maximum power PMAX, wherein the available maximum power PMAX corresponds to the minimum between the maximum conversion power PCONV and the source power PS which is equivalent to the primary power PRPOW, namely PS=PRPOW, in this automatic sub-mode «AUTO» of the hybrid power supply mode HYBMOD.

If during the charge level control step C4-1, the charge level CL of the rechargeable secondary power supply source SEC is comprised between the low threshold LOW and the high threshold HIGH, then a step S4-2, or step «KA=KAMIN», which sets the coefficient ka to the value kamin, kamin being comprised between 0.5 and 0.7. In other words, and for example, if the charge level CL of the battery is 30% of its charge capacity, then the provided secondary power SECPOW is equal to kamin times the secondary maximum power SECPOWMAX, namely SECPOW=kamin.SECPOWMAX. This step S4-2 is followed by a step F4-2, or «POWER ALLOCATION» step, which implements the allocation method «POWER ALLOCATION» for allocating the available maximum power PMAX, wherein the available maximum power PMAX corresponds to the minimum between the maximum conversion power PCONV and the source power PS which is equivalent to the sum of the primary power PRPOW and the secondary power SECPOW, namely PS=PRPOW+kamin.SECPOWMAX in this automatic sub-mode «AUTO» of the hybrid power supply mode HYBMOD. These steps S4-2 and F4-2 are executed as long as the charge level CL is higher than the low threshold LOW and, if the charge level CL drops below the low threshold LOW, then steps S4-1 and F4-1 are executed.

If during the charge level control step C4-1, the charge level CL of the rechargeable secondary power supply source SEC is greater than the high threshold HIGH, then a step S4-3 is executed, or step «KA=KAMAX», which sets the coefficient ka to the value kamax, kamax being comprised between 0.8 and 1. In other words, and for example, if the NC charge level of the battery is 90% of its charge capacity, then the provided secondary power SECPOW is equal to kamax times the maximum secondary power SECPOWMAX, namely SECPOW=kamax.SECPOWMAX. This step S4-3 is followed by a step F4-3, or «POWER ALLOCATION» step, which implements the allocation method «POWER ALLOCATION» for allocating the available maximum power PMAX, wherein the available maximum power PMAX corresponds to the minimum between the maximum conversion power PCONV and the source power PS which is equivalent to the sum of the primary power PRPOW and the secondary power SECPOW, namely PS=PRPOW+kamax.SECPOWMAX in this automatic sub-mode «AUTO» of the hybrid power supply mode HYBMOD. These steps S4-3 and F4-3 are executed as long as the charge level CL is higher than the high threshold HIGH and, if the charge level CL drops below the high threshold HIGH, then steps S4-2 and F4-2 are executed.

If the sub-mode selected during the sub-mode selection step C4 is the economical sub-mode «ECO», then a step of controlling a charge level C4-2 is executed, or «CHARGE LEVEL CONTROL» step, during which the charge level CL of the rechargeable secondary power supply source SEC is measured and is compared with the low threshold LOW and the high threshold HIGH.

If, during the charge level control step C4-2, the charge level CL of the rechargeable secondary power supply source SEC is lower than the low threshold LOW, then a step S4-4 is executed, or step «KE=0», which sets the coefficient ke to zero, so that the secondary power SECPOW is zero. In other words, if the charge level CL is less than 5 to 15% of the charge capacity, then the rechargeable secondary power supply source SEC does not provide any power, and thus the source power PS is entirely provided by the primary power supply source PRIM. This step S4-4 is followed by a step F4-4, or «POWER ALLOCATION» step, which implements the allocation method «POWER ALLOCATION» for allocating the available maximum power PMAX, wherein the available maximum power PMAX corresponds to the minimum between the maximum conversion power PCONV and the source power PS which is equivalent to the primary power PRPOW, namely PS=PRPOW, in this economical sub-mode «ECO» of the hybrid power supply mode HYBMOD.

If during the charge level control step C4-2, the charge level CL of the rechargeable secondary power supply source SEC is comprised between the low threshold LOW and the high threshold HIGH, then a step S4-5, or step «KE=KEMIN», which sets the coefficient ke to the value kemin, kemin being comprised between 0.2 and 0.4. In other words, and for example, if the charge level CL of the battery is 30% of its charge capacity, then the provided secondary power SECPOW is equal to kemin times the maximum secondary power SECPOWMAX, namely SECPOW=kemin.SECPOWMAX. This step S4-5 is followed by a step F4-5, or «POWER ALLOCATION» step, which implements the allocation method «POWER ALLOCATION» for allocating the available maximum power PMAX, wherein the available maximum power PMAX corresponds to the minimum between the maximum conversion power PCONV and the source power PS which is equivalent to the sum of the primary power PRPOW and of the secondary power SECPOW, namely PS=PRPOW+kemin.SECPOWMAX in this economical sub-mode «ECO» of the hybrid power supply mode HYBMOD. These steps S4-5 and F4-5 are executed as long as the charge level CL is higher than the low threshold LOW and, if the charge level CL drops below the low threshold LOW, then steps S4-4 and F4-4 are executed.

If during the charge level control step C4-2, the charge level CL of the rechargeable secondary power supply source SEC is greater than the high threshold HIGH, then a step S4-6 is executed, or step «KE=KEMAX», which sets the coefficient ke to the value kemax, kemax being comprised between 0.6 and 0.8. In other words, and for example, if the charge level CL of the battery is 90% of its charge capacity, then the provided secondary power SECPOW is equal to kemax times the secondary maximum power SECPOWMAX, namely SECPOW=kemax.SECPOWMAX. This step S4-6 is followed by a step F4-6, or «POWER ALLOCATION» step, which implements the allocation method «POWER ALLOCATION» for allocating the available maximum power PMAX, wherein the available maximum power PMAX corresponds to the minimum between the maximum conversion power PCONV and the source power PS which is equivalent to the sum of the primary power PRPOW and of the secondary power SECPOW, namely PS=PRPOW+kemax.SECPOWMAX in this economical sub-mode «ECO» of the hybrid power supply mode HYBMOD. These steps S4-6 and F4-6 are executed as long as the charge level CL is higher than the high threshold HIGH and, if the charge level CL drops below the high threshold HIGH, then steps S4-5 and F4-5 are executed.

If the selected sub-mode during the sub-mode selection step C4 is the extreme sub-mode «EXTR», then a step F4-0, or «POWER ALLOCATION» step, is executed which implements the allocation method «POWER ALLOCATION» for allocating the available maximum power PMAX, wherein the available maximum power PMAX corresponds to the minimum between the maximum conversion power PCONV and the source power PS which is equivalent to the sum of the primary power PRPOW and the secondary power SECPOW which is equal to SECPOWMAX, namely PS=PRPOW+SECPOWMAX in this extreme sub-mode «EXTR» of the hybrid power supply mode HYBMOD.

According to one possibility, in the extreme sub-mode «EXTR» in step F4-0, when the charge level CL of the rechargeable secondary power supply source SEC drops below the low threshold LOW then the management method «POWER MANAGEMENT» automatically switches in the standby mode «STANDBY» described above, during which only the safety equipment of the crane CR is powered to allow the crane CR to be safe-guarded, and for example to be placed in a weather vane state.

The second part of the following description relates to the implementation of the allocation method «POWER ALLOCATION» for allocating the available maximum power PMAX to the various electrical equipment 9 of the crane CR, regardless of the management mode among the hybrid power supply mode HYBMOD, autonomous power supply mode AUTOMOD, main power supply mode MAINMOD and mixed recharging/powering mode MIXMOD. The purpose of this allocation method «POWER ALLOCATION» is to optimize the allocation of the available maximum power PMAX, in particular when this available maximum power PMAX is insufficient to power all the electrical equipment 9 of the crane CR at full capacity.

As previously described, the available maximum power PMAX depends on the management mode, the management sub-mode and the charge level CL of the rechargeable secondary power supply source SEC, with an available maximum power PMAX which is equivalent to the minimum between the maximum conversion power PCONV and the source power PS which is equivalent to:

- in step F1 in main power supply mode MAINMOD, the primary power PRPOW (namely PS=PRPOW),
- in step F1 in mixed recharging/powering mode MIXMOD, the primary power PRPOW minus the recharging power PCH (namely PS=PRPOW−PCH);
- in step F3-2 in automatic sub-mode «AUTO» of the autonomous power supply mode AUTOMOD, the secondary power SECPOW which is equal to kamin.SECPOWMAX (namely PS=SECPOW=kamin.SECPOWMAX);
- in step F3-3 in automatic sub-mode «AUTO» of the autonomous power supply mode AUTOMOD, the secondary power SECPOW which is equal to kamax.SECPOWMAX (namely PS=SECPOW=kamax.SECPOWMAX);
- in step F3-5 in economical sub-mode «ECO» of the autonomous power supply mode AUTOMOD, the secondary power SECPOW which is equal to kemin.SECPOWMAX (namely PS=SECPOW=kemin.SECPOWMAX);
- in step F3-6 in economical sub-mode «ECO» of the autonomous power supply mode AUTOMOD, the secondary power SECPOW which is equal to kemax.SECPOWMAX (namely PS=SECPOW=kemax.SECPOWMAX);
- in step F3-0 in extreme sub-mode «EXTR» of the autonomous power supply mode AUTOMOD, the secondary power SECPOW which is equal to SECPOWMAX (namely PS=SECPOW=SECPOWMAX);
- in step F4-1 in automatic sub-mode «AUTO» of the hybrid power supply mode HYBMOD, the primary power PRPOW (namely PS=PRPOW);
- in step F4-2 in automatic sub-mode «AUTO» of the hybrid power supply mode HYBMOD, the sum of the primary power PRPOW and the secondary power SECPOW which is equal to kamin.SECPOWMAX (namely PS=PRPOW+SECPOW=PRPOW+kamin.SECPOWMAX),
- in step F4-3 in automatic sub-mode «AUTO» of the hybrid power supply mode HYBMOD, the sum of the primary power PRPOW and the secondary power SECPOW which is equal to kamax.SECPOWMAX (namely PS=PRPOW+SECPOW=PRPOW+kamax.SECPOWMAX),
- in step F4-4 in economical sub-mode «ECO» of the hybrid power supply mode HYBMOD, the primary power PRPOW (namely PS=PRPOW);
- in step F4-5 in economical sub-mode «ECO» of the hybrid power supply mode HYBMOD, the sum of the primary power PRPOW and the secondary power SECPOW which is equal to kemin.SECPOWMAX (namely PS=PRPOW+SECPOW=PRPOW+kemin.SECPOWMAX),
- in step F4-6 in economical sub-mode «ECO» of the hybrid power supply mode HYBMOD, the sum of the primary power PRPOW and the secondary power SECPOW which is equal to kemax.SECPOWMAX (namely PS=PRPOW+SECPOW=PRPOW+kemax.SECPOWMAX),
- in step F4-0 in extreme sub-mode «EXTR» of the hybrid power supply mode HYBMOD, the sum of the primary power PRPOW and the secondary power SECPOW which is equal to SECPOWMAX (namely PS=PRPOW+SECPOW=PRPOW+SECPOWMAX).

Figure 7:
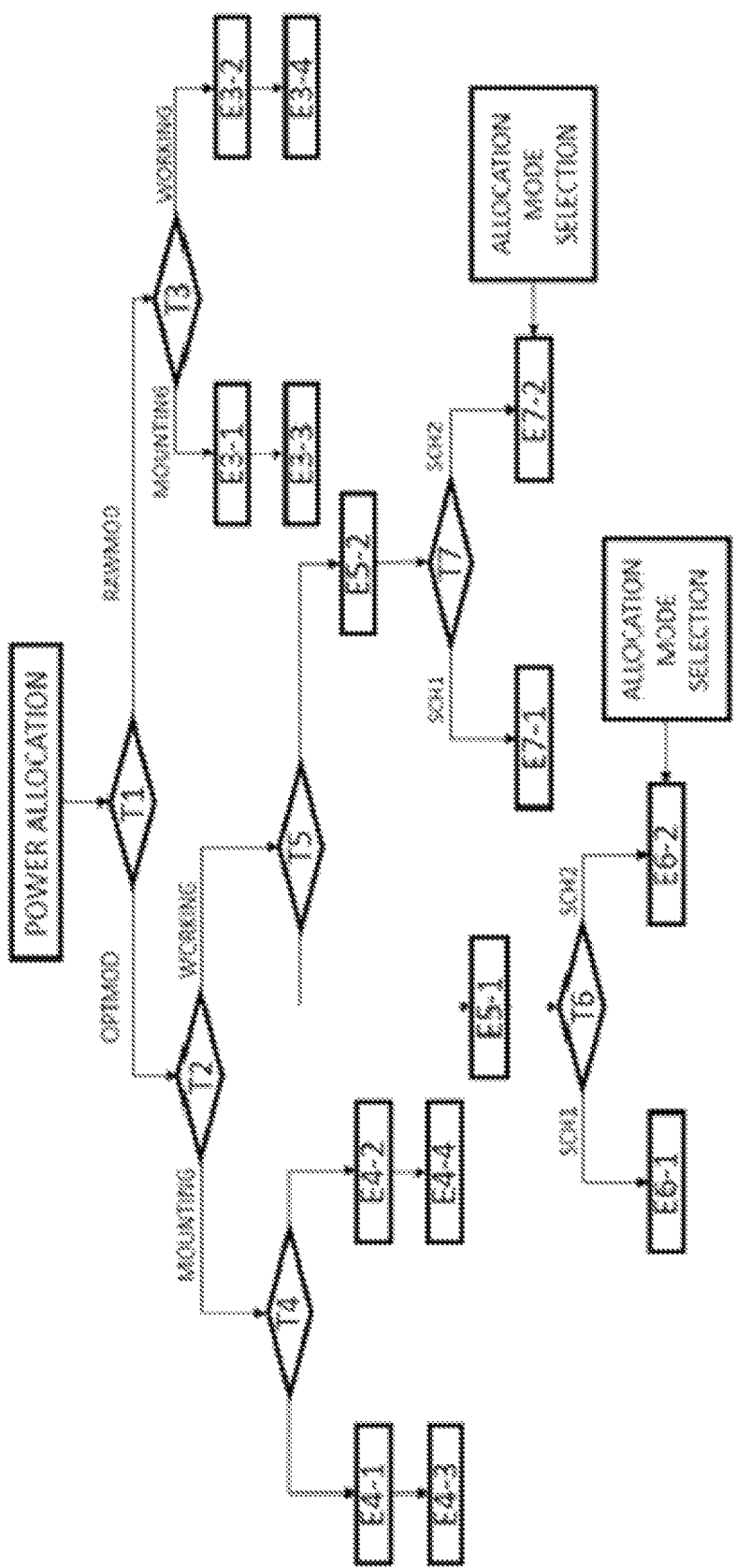
FIG. 7 is a flowchart showing the different steps to be performed when implementing an allocation method for allocating electrical power to electrically power the electrical equipment of the crane.

Referring to FIG. 7, this allocation method «POWER ALLOCATION» implements an initial selection step T1, or «MODE SELECTION» step, which consists of a selection between:

- a raw mode «RAWMOD» in which the available maximum power PMAX is allocated over predefined actuation equipment 91, 92 and over predefined accessory equipment 93, 94 among the electrical equipment 9 of the crane CR, the actuation equipment 91, 92 being defined according to a crane CR configuration; and
- an optimized mode «OPTMOD» in which the available maximum power PMAX is allocated over the predefined actuation equipment 91, 92, and also over the accessory equipment 93, 94 but also according to cut-off conditions associated to the accessory equipment 93, 94, so that according to their respective cut-off conditions the accessory equipment 93, 94 are powered or not.

The actuation equipment 91, 92 may comprise mounting equipment 91 which participates in the mounting of the crane CR when the crane CR is in a mounting configuration designated by «MOUNTING» in FIG. 7, and the actuation equipment 91, 92 comprise working equipment 92 which participate in the displacement of a charge when the crane CR is in a working configuration designated by «WORKING» in FIG. 7. It is conceivable that the crane CR does not include mounting equipment 91, as for example in the case of a top slewing crane.

The mounting equipment 91 may comprise at least one of the following equipment: a hydraulic folding/unfolding unit allowing a mast and a jib to be folded/unfolded, a hydraulic wedging unit enabling the crane to be wedged on the ground, a hydraulic orientation unit allowing an orientation of a base of the crane, a hydraulic jib crane unit allowing an actuation of a mounting jib crane. In general, in the mounting configuration, in other words during the mounting/dismounting phases of the crane, either a single mounting equipment 91 is actuated (for example the hydraulic folding/unfolding unit), or several mounting equipment 91 are actuated successively and individually because the mounting/dismounting phases are sequenced.

The working equipment 92 may comprise at least one of the following equipment: a motorized lifting system 920 allowing lifting/lowering of a load, a motorized distribution system 921 allowing a distribution of a load along a jib, a motorized orientation system 922 allowing orientation of a jib, a motorized translation system allowing translation of the crane, a motorized lifting system allowing lifting of a luffing jib (or tilting jib). In general, in the working configuration, in other words during the phases of displacing a load, several working equipment 92 are actuated simultaneously, and sometimes are successively and individually actuated.

For the rest of the description, three working equipment 92 will be considered for the crane CR when in working configuration, namely:

the motorized lifting system 920 which receives an electrical lifting power PLIFT, which is less than or equal to the electrical power required by this motorized lifting system 920;

the motorized distribution system 921 which receives an electrical distribution power PDIST, which is less than or equal to the requested electrical power by this motorized distribution system 921;

the motorized orientation system 922 which receives an orientation electrical power PORIEN, which is less than or equal to the electrical power required by this motorized orientation system 922.

The accessory equipment 93, 94 are equipment which do not take part in the operations of mounting and displacing a load or a structural element of the crane CR, and these accessory equipment 93, 94 may comprise one or more system accessory equipment 93 and/or one or more user accessory equipment 94.

The system accessory equipment 93 may comprise at least one of the following equipment:

a heating system 931 to heat a space 71 in the crane CR, such as for example a cockpit;

a ventilation or cooling system 932 to ventilate/cool a space 72 in the crane CR;

and the cut-off conditions for the system accessory equipment 931, 932, in the optimized mode «OPTMOD», can depend on at least one environmental parameter which is a physical parameter representative of the space 71, 72 of the crane CR. According to one possibility, this environmental parameter is an internal space temperature of the crane CR.

The space 72 of the crane CR can correspond to an electrical cabinet internally grouping all or part of the organs participating in the power supply of the crane CR. In other words, in the optimized mode «OPTMOD», the heating of the cockpit 71, and the ventilation or cooling of this electrical cabinet 72 will depend on the cut-off conditions which are a function of the internal temperature respectively in this cockpit 71 and in this electrical cabinet 72.

The user accessory equipment 94 may comprise at least one of the following equipment: a lighting system 941, an electrical socket 942; and the cut-off conditions for this user accessory equipment 94, in the optimized mode «OPTMOD», may depend on a selection of a classification made by a user for or each of the user accessory equipment 94, amongst the following classifications:

a «non-essential» classification which corresponds to an authorization not to power the corresponding user accessory equipment 94 in the optimized mode OPTMOD in favor of the actuation equipment 91, 92; and an «essential» classification which corresponds to a prohibition not to power the corresponding user accessory equipment 94 in the optimized mode OPTMOD.

Referring to FIG. 7, if during the initial selection step T1, the raw mode RAWMOD is selected, then a step of selecting a configuration T3 is executed, or «CONFIGURATION SELECTION» step, in which a choice is made of the crane configuration between the mounting configuration and the working configuration.

And in the same way, if during the initial selection step T1, the optimized mode OPTMOD is selected, then a step of selecting a configuration T2 is executed, or «CONFIGURATION SELECTION» step, in which a choice of a crane configuration is made between the mounting configuration and the working configuration.

If, in the raw mode RAWMOD, during the configuration selection step T3, the mounting configuration is selected, then a step E3-1, or «ALLOCATION PMAX» step, is executed during which the available maximum power PMAX is allocated over the actuation equipment 91, 92 (which here are the mounting equipment 91) and over the accessory equipment 93, 94, such that this/these mounting equipment 91 receive an actuation power PACT which is equivalent to the available maximum power PMAX reduced by a power accessory PACC, namely PACT=PMAX-PACC; the accessory power PACC corresponding to the electrical power requested by the accessory equipment 93, 94 or the power necessary to power this accessory equipment 93, 94. This step E3-2 is followed by a step E3-3, or «ALLOCATION PACT» step, during which the actuation power PACT is allocated over the mounting equipment 91, so that each mounting equipment 91 receives an electrical power which is less than or equal to this actuation power PACT. If only one mounting equipment 91 is involved (for example the hydraulic folding/unfolding unit) then all the actuation power PACT are allocated to this single mounting equipment 91.

If, however, in the raw mode RAWMOD, during the configuration selection step T3, the working configuration is selected, then a step E3-2, or «ALLOCATION PMAX» step, is executed during which the available maximum power PMAX is allocated over the actuation equipment 91, 92 (which are here the working equipment 92) and over the accessory equipment 93, 94, such that this/these working equipment 92 receive an actuation power PACT which is equivalent to the available maximum power PMAX minus the accessory power PACC, namely PACT=PMAX-PACC. This step E3-2 is followed by a step E3-4, or «ALLOCATION PACT» step, during which the actuation power PACT is allocated over the various working equipment 92, so that each working equipment 92 receives an electrical power which is less than or equal to this actuation power PACT which amounts to, in the embodiment described above, PLIFT≤PACT, PDIST≤PACT and PORIEN≤PACT.

In the optimized mode OPTMOD, the actuation equipment 91, 92 can be powered by the actuation power PACT which is equivalent:

either to the available maximum power PMAX if the cut-off conditions are such that all the accessory equipment 93, 94 are cut off (therefore turned off or not powered), so PACT=PMAX;

or to the available maximum power PMAX minus the accessory power PACC, so PACT=PMAX-PACC, this accessory power PACC corresponding to the electrical power requested by the accessory equipment 93, 94 which is/are not cut according to the cut-off conditions.

Thus, the accessory equipment 93, 94 will be divided into:

cut accessory equipment, which are accessory equipment whose cut-off conditions are satisfied such that those cut accessory equipment are not electrically powered; and uncut accessory equipment, which are accessory equipment whose cut-off conditions are not satisfied such that those uncut accessory equipment are not electrically powered.

For user accessory equipment 94, cut accessory equipment are accessory equipment for which a «non-essential» classification has been selected, and uncut accessory equipment are accessory equipment for which an «essential» classification has been selected.

Thus, with reference to FIG. 7, if during the configuration selection step T2, the mounting configuration is selected, then a step of verifying the cut-off conditions T4 is executed, or the «CUT-OFF VERIFICATION» step, in which the cut-off conditions associated to the various accessory equipment 93, 94 are controlled, which leads to two situations.

In a first situation, if at least one cut-off condition is not satisfied, then a step E4-1, or «ALLOCATION PMAX» step, is executed during which the available maximum power PMAX is allocated over the actuation equipment 91, 92 (which are here the mounting equipment 91) and on the uncut accessory equipment, so that this/these mounting equipment 91 receive an actuation power PACT which is equivalent to the available maximum power PMAX minus the accessory power PACC, namely PACT=PMAX-PACC. This step E4-1 is followed by a step E4-3, or «ALLOCATION PACT» step, during which the actuation power PACT is allocated over the mounting equipment 91, so that each mounting equipment 91 receives an electrical power which is less than or equal to this actuation power PACT. If only one mounting equipment 91 is involved (for example the hydraulic folding/unfolding unit) then all the actuation power PACT is allocated to this single mounting equipment 91.

In a second situation, if on the other hand all the cut-off conditions are satisfied, then a step E4-2 is executed, or «ALLOCATION PMAX» step, during which the available maximum power PMAX is allocated only to the actuation equipment 91, 92 (which here are the mounting equipment), so that this/these mounting equipment 91 receive an actuation power PACT which is equivalent to the available maximum power PMAX, namely PACT=PMAX. This step E4-2 is followed by a step E4-4, or «ALLOCATION PACT» step, during which the actuation power PACT is allocated over the mounting equipment 91, so that each mounting equipment 91 receives an electrical power which is less than or equal to this available maximum power PMAX. If only one mounting equipment 91 is involved, then all the available maximum power PMAX is allocated to this single mounting equipment 91.

In the same way, if during the configuration selection step T2, the working configuration is selected, then a step of verifying the cut-off conditions T5 is executed, or the «CUT-OFF VERIFICATION» step, in which the cut-off conditions of different accessory equipment 93, 94 are controlled, which leads to two situations.

In a first situation, if at least one cut-off condition is not satisfied, then a step E5-1, or «ALLOCATION PMAX» step, is executed during which the available maximum power PMAX is allocated over the actuation equipment 91, 92 (which here are the working equipment 92) and on the uncut accessory equipment, so that this/these working equipment 92 receive an actuation power PACT which is equivalent to the available maximum power PMAX minus the accessory power PACC, namely PACT=PMAX-PACC.

In a second situation, if however, all the cut-off conditions are satisfied, then a step E5-2 is executed, or the «ALLOCATION PMAX» step, during which the available maximum power PMAX is allocated only to the actuation equipment 91, 92 (which here are the working equipment 92), so that this/these working equipment 92 receive an actuation power PACT which is equivalent to the available maximum power PMAX, namely PACT=PMAX.

The step E5-1 is followed by a step of selecting a scheme T6, or «SCHEME SELECTION» step, and similarly step E5-1 is followed by a step of selecting a scheme T7, or «SCHEME SELECTION» step.

The scheme selection step T6 or T7 is a step during which a selection of an allocation scheme for an allocation of the actuation power PACT over the different working equipment 92 is made, amongst the following two allocation schemes:

a first scheme SCH1 in which the working equipment 92 are sequentially activated and therefore sequentially powered (that is to say one after the other, in a non-combined manner), so that each working equipment 92 is powered, when activated, by the actuation power PACT; and a second scheme SCH2 in which the working equipment 92 are simultaneously activated and therefore simultaneously powered (that is to say one at the same time as the other, in a combined manner), so that all the working equipment 92 are powered together by the actuation power PACT.

Thus, if the first scheme SCH1 is selected during the scheme selection step T6, then a step E6-1, or «ALLOCATION PACT» step, is executed during which the actuation power PACT (with the reminder PACT=PMAX-PACC) is integrally and sequentially allocated to each working equipment 92 when activated, so that each working equipment 92 receives, when activated, an electrical power which is less than or equal to this actuation power PACT. On the other hand, if the second scheme SCH2 is selected during the scheme selection step T6, then a step E6-2, or «ALLOCATION PACT» step, is executed during which the actuation power PACT (with reminder PACT=PMAX-PACC) is allocated over the different working equipment 92 which are activated (and therefore require energy) in a combined manner.

Similarly, if the first scheme SCH1 is selected during the scheme selection step T7, then a step E7-1, or «ALLOCATION PACT» step, is executed during which the actuation power PACT (with reminder PACT=PMAX) is integrally and sequentially allocated to each working equipment 92 when activated, so that each working equipment 92 receives, when activated, an electrical power which is less than or equal to this actuation power PACT. On the other hand, if the second scheme SCH2 is selected during the scheme selection step T7, then a step E7-2, or «ALLOCATION PACT» step, is executed during which the actuation power PACT (with reminder PACT=PMAX) is allocated over the different working equipment 92 which are activated (and therefore require energy) in a combined manner.

According to one possibility, a storage in a memory of a plurality of preferential allocation modes is implemented, each preferential allocation mode being associated with percentages of allocation of the actuation power PACT over the different working equipment 92 in the second scheme, with for example an allocation as follows:

PACT=PLIFT+PDIS+PORIEN, with PLIFT=q1. PACT, PDIS=q2. PACT et PORIEN=q3. PACT;

wherein q1, q2 and q3 are allocation quantities or percentages, with q1+q2+q3=1.

Each preferential allocation mode is thus associated with different allocation quantities or percentages q1, q2 and q3. These allocation modes are implemented if the actuation power PACT is less than the sum of the powers requested by the working equipment 92. Indeed, if the actuation power PACT is greater than or equal to the sum of the powers requested by the working equipment 92, then all the working equipment 92 can be powered to their full power.

Also, the allocation method «POWER ALLOCATION» can implement a step for selecting an allocation mode, or «ALLOCATION MODE SELECTION» step, so that the step E6-2 or the step E7-2 executes an allocation of the actuation power PACT to the different working equipment 92 in accordance with the selected preferential allocation mode.

Figure 8:
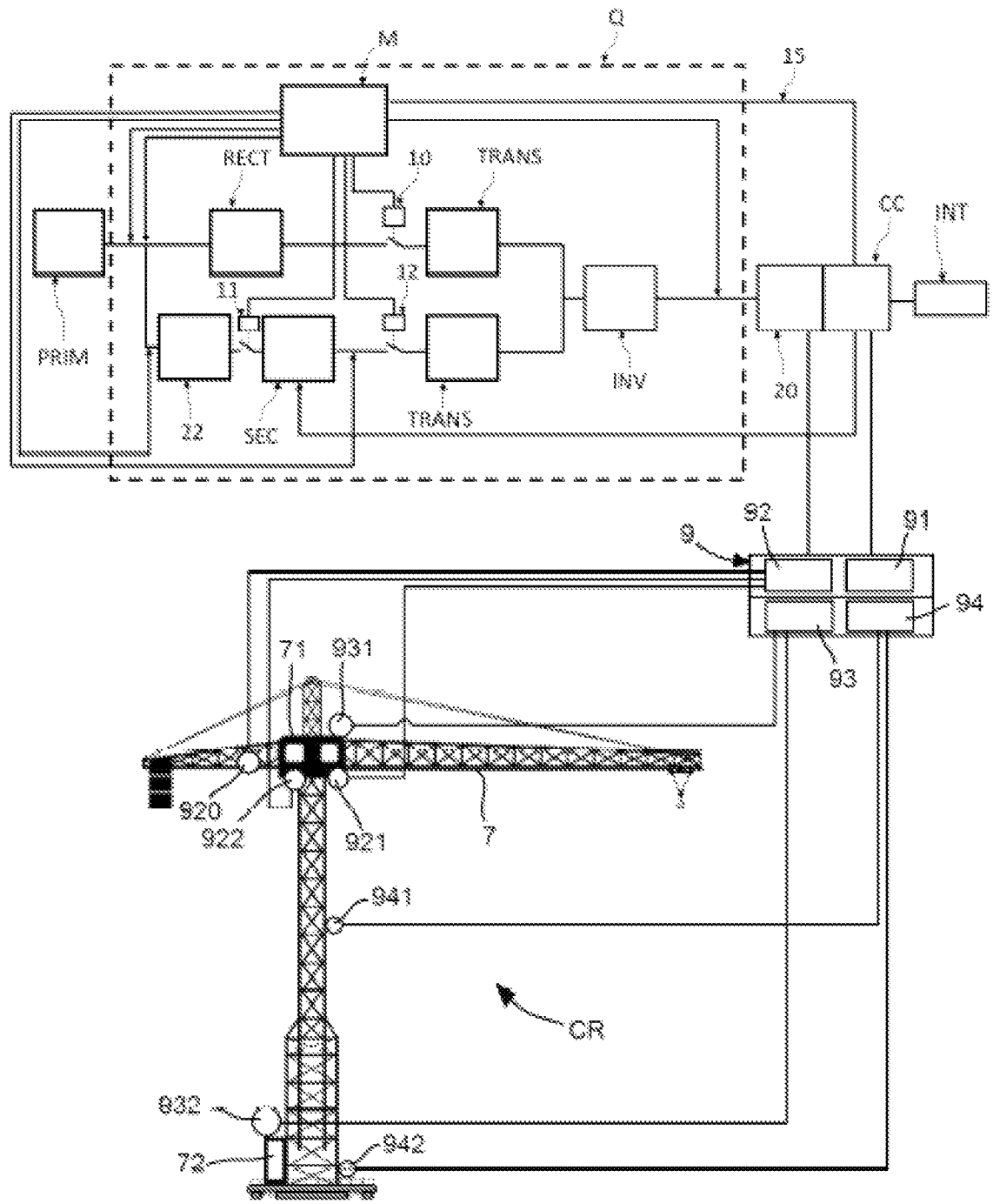
FIG. 8 is a block diagram representing a conversion circuit connecting a primary power supply source and a rechargeable secondary power supply source to the electrical equipment of the crane.

The rest of the description concerns the crane CR which comprises the electrical equipment 9 electrically powered, via the conversion circuit Q presented in FIG. 8, by the primary power supply source PRIM capable of providing the primary power PRPOW and the rechargeable secondary power supply source SEC capable of providing the secondary power SECPOW.

This crane CR comprises:
- a monitoring unit M to monitor the requested general power RGPOW which corresponds as a reminder to the power requested by all the electrical equipment 9 and to monitor the charge level CL of the rechargeable secondary power supply source SEC, and
- the control/command unit CC connected to the monitoring unit M and to the conversion circuit Q, and configured to implement the management method «POWER MANAGEMENT» of FIG. 6 previously described.

There may be a recharging electrical interface 22 between the primary power supply source PRIM and the rechargeable secondary power supply source SEC intended to adapt the voltage provided by the primary power supply source PRIM to a recharging voltage of the rechargeable secondary power supply source SEC. The electrical recharging interface 22 makes it possible to recharge the rechargeable secondary power supply source SEC when the primary power supply source PRIM is connected and the electrical power consumption of the crane CR is lower than the primary power PRPOW provided by the primary power supply source PRIM.

The control/command unit CC is also configured for the implementation of the allocation method «POWER ALLOCATION» of FIG. 7 to allocate the available maximum power PMAX on the several electrical equipment 9 of the crane CR.

Also, this control/command unit CC is connected, on the one hand, to a user interface INT allowing a selection between the raw mode RAWMOD and the optimized mode OPTMOD and, on the other hand, to an electrical circuit connecting the at least one power supply source to the electrical equipment 9 to control an allocation of the available maximum power PMAX according to the mode selected among the raw mode RAWMOD and the optimized mode OPTMOD.

According to one possibility, the primary power supply source PRIM delivers a primary power supply voltage of the single-phase or three-phase type, for example 230 or 400 volts, and the conversion circuit Q ensures a conversion of said primary power supply voltage into a three-phase power supply voltage. The three-phase power supply voltage can be obtained by assembling three single-phase converters coupled or synchronized together to generate a three-phase power supply voltage.

The monitoring unit M can be a microcontroller and the conversion circuit Q can be an electrical converter AC/AC comprising a rectifier RECT and an inverter INV as shown in FIG. 8, the rectifier RECT being used to convert an alternating voltage coming from the primary power supply source PRIM into a direct voltage that can be injected at the input of a lifting electrical component TRANS intended to lift the value of the electrical signal such as an electrical transformer for example, and the inverter INV used to convert the direct voltage at the output of the lifting component TRANS or else of the rechargeable secondary power supply source SEC into an alternating voltage intended to power an electrical interface circuit 20 preceding the user interface INT.

According to one embodiment, the monitoring unit M selects the power supply source among the primary power supply source PRIM and the rechargeable secondary power supply source SEC thanks to a switching on or off electrical switches 10, 11, 12. The electrical switches 10, 11, 12 presented in FIG. 8 can designate electromechanical relays for example.

If the switch 10 is off, then the transfer of power from the primary power supply source PRIM to the electrical equipment 9 of the crane CR is activated. If the switch 11 is off, then the transfer of power from the primary power supply source PRIM to the rechargeable secondary power supply source SEC is activated, in other words the rechargeable secondary power supply source SEC is recharged. If the switch 12 is off, then the transfer of power from the rechargeable secondary power supply source SEC to the electrical equipment 9 of the crane CR is activated.

The conversion circuit Q can also comprise at least one frequency converter not represented in FIG. 8 as well as a current measurement component connected to the output of the rechargeable secondary power supply source such as an electrical shunt not represented in FIG. 8.

The crane CR further comprises the user interface INT connected to the control-command unit CC to:
- select the management sub-mode among the previously described management sub-modes which are the automatic sub-mode «AUTO», the economical sub-mode «ECO» and the extreme sub-mode «EXTR»,
- select between the raw mode «RAWMOD» and the optimized mode «OPTMOD»,
- select the classification of user accessory equipment 94 from the «non-essential» classification and the «essential» classification;
- select the allocation scheme among the first scheme SCH1 and the second scheme SCH2;
- select a preferential allocation mode among the preferential allocation modes stored in the memory.

The control-command unit CC can be connected to the monitoring unit M by a communication bus 15 so that the control-command unit CC can permanently receive information on electrical quantities from the monitoring unit M such as an input voltage of the rectifier RECT or even an output voltage of the inverter INV, so that the control-command unit CC can adjust parameters of the conversion circuit Q such as turning on or off the electrical switches 10, 11, 12 for example.

The control-command unit CC can further receive from the monitoring unit M the power supply mode implemented by the power supply management method «POWER MANAGEMENT» or else a value of the primary power supply voltage.

The control-command unit CC can transfer to the monitoring unit M the primary power PRPOW entered by a user in the user interface INT and which can be used by the monitoring unit M for calculating the available maximum power PMAX.

Furthermore, according to one embodiment, the control-command unit CC is capable of finding the power supply mode implemented by the power supply management method «POWER MANAGEMENT» on the basis of the state of the electrical switches 10, 11, 12 or on the basis of a value of the primary voltage sent by the monitoring unit M via the communication bus 15.

According to one possibility, the control-command unit CC first calculates the available maximum power PMAX according to the power supply source(s) providing the electrical power, as well as the implemented power supply mode, then the control-command unit CC manages the allocation of the available maximum power PMAX over the different electrical equipment 9 of the crane CR.

According to one possibility, a user of the crane CR, for example a pilot of the crane CR, informs the primary power PRPOW, the management sub-mode and one or more preferential allocation modes.

According to one possibility, the control-command unit CC indicates to the user of the crane CR via the user interface INT the charge level CL of the rechargeable secondary power supply source SEC, the implemented power supply mode and a standby information if the system switches to a standby mode.

The charge level CL of the rechargeable secondary power supply source SEC is estimated by the control-command unit CC from, for example, a recharging and discharging current of the rechargeable secondary power supply source SEC, thus, the control-command unit CC can for example know the capacity of the battery in Ah or Wh. A calibration can be performed when the rechargeable secondary power supply source SEC is fully charged.

The invention claimed is:

1. A management method for managing electrical power supply for electrically powering electrical equipment of a crane, via a conversion circuit, from a primary power supply source capable of providing a primary power and from a rechargeable secondary power supply source capable of providing a secondary power, wherein said management method comprises a monitoring of a requested general power which corresponds to a power requested by all the electrical equipment and a monitoring of a charge level of the rechargeable secondary power supply source, and
   wherein the management method implements, depending on said requested general power and said charge level, at least the following management modes:
   a recharging mode in which the requested general power is zero and the primary power supply source is available and connected to the rechargeable secondary power supply source to recharge it according to its charge level;
   a mixed recharging/powering mode in which the requested general power is non-zero, and the primary power supply source is available and connected, on the one hand, to the electrical equipment to electrically power them and, on the other hand, to the rechargeable secondary power supply source to recharge it depending on the charge level;
   a main power supply mode in which the requested general power is non-zero, and only the primary power supply source is connected to the electrical equipment to electrically power them;
   a hybrid power supply mode in which the requested general power is non-zero, and the primary power supply source and the rechargeable secondary power supply source are both connected to the electrical equipment to electrically power them; and
   an autonomous power supply mode in which the requested general power is non-zero, and only the rechargeable secondary power supply source is connected to the electrical equipment to electrically power them according to the charge level;
   wherein the electrical equipment are powered by an available maximum power which corresponds to a minimum between a maximum conversion power and a source power, wherein the maximum conversion power corresponds to a maximum power that can be delivered at the output of the conversion circuit and wherein the source power corresponds to:
   the sum of the secondary power and of the primary power in the hybrid power supply mode;
   the secondary power in the autonomous power supply mode;
   the primary power in the main power supply mode; and
   the primary power minus a recharging power used to recharge the rechargeable secondary power supply source in the mixed recharging/powering mode;
   wherein the management method implements, in the autonomous power supply mode and in the hybrid power supply mode, an adaptation of the secondary power as a function at least of the charge level, said secondary power being lower than or equal to a secondary maximum power which corresponds to a maximum power that can be delivered by the rechargeable secondary power supply source,
   wherein an allocation method for allocating the available maximum power over the different electrical equipment is implemented, regardless of the management mode amongst the hybrid power supply mode, the autonomous power supply mode, the main power supply mode and the mixed recharging/powering mode;
   wherein the management method implements a selection, in the hybrid power supply mode and in the autonomous power supply mode, of a management sub-mode amongst several management sub-modes comprising at least:
   an automatic sub-mode in which the secondary power is monitored so as to correspond to ka times the secondary maximum power, wherein ka is a coefficient that is less than or equal to 1 and which decreases with the charge level until the charge level drops below a low threshold, wherein the coefficient ka is equal to kamax as long as the charge level of the rechargeable secondary power supply source is above a high threshold, then the coefficient ka is equal to kamin when the charge level is comprised between the low threshold and the high threshold, and finally the coefficient ka is zero when the charge level of the rechargeable secondary power supply source is below the low threshold, wherein kamax is higher than kamin; and
   an economical sub-mode in which the secondary power is monitored so as to correspond to ke times the secondary maximum power, wherein ke is a coefficient lower than ka and which decreases with the charge level until the charge level drops below a low threshold, wherein the coefficient ke is equal to kemax as long as the charge level of the rechargeable secondary power supply source is above the high threshold, then the coefficient ke is equal to kemin when the charge level of the rechargeable secondary power supply source is comprised between the low threshold and the high threshold, and finally the coefficient ke is zero when the charge level of the rechargeable secondary power supply source is below the low threshold, wherein kemax is higher than kemin, kamax is higher than kemax and kamin is higher than kemin.

2. The management method according to claim 1, wherein kamax is comprised between 0.8 and 1, kamin is comprised between 0.5 and 0.7, kemax is comprised between 0.6 and 0.8 and kemin is comprised between 0.2 and 0.4.

3. The management method according to claim 1, wherein the low threshold is comprised between 5 and 15% of a charge capacity of the rechargeable secondary power supply source and the high threshold is comprised between 40 and 60% of a charge capacity of the rechargeable secondary power supply source.

4. The management method according to claim 1, wherein, in the autonomous power supply mode and whether in the automatic sub-mode or in the economical sub-mode, the management method automatically switches into a standby mode after the charge level of the rechargeable secondary power supply source drops below the low threshold, wherein in the standby mode only predefined safety equipment amongst the electrical equipment are powered to allow the crane to be safe-guarded.

5. The management method according to claim 4, wherein, in the standby mode, the secondary power is monitored to match the secondary maximum power in order to power the safety equipment at least while safeguarding the crane.

6. The management method according to claim 1, wherein the management sub-modes also comprise an extreme sub-mode in which the secondary power corresponds to the secondary maximum power regardless of the value of the charge level of the rechargeable secondary power supply source.

7. The management method according to claim 4, wherein the management sub-modes also comprise an extreme sub-mode in which the secondary power corresponds to the secondary maximum power regardless of the value of the charge level of the rechargeable secondary power supply source, and
wherein, in the extreme sub-mode, when the charge level of the rechargeable secondary power supply source drops below the low threshold, then only the safety equipment are powered to allow the crane to be safeguarded.

8. The management method according to claim 1, wherein the allocation method comprises a step of selecting between:
a raw mode in which the available maximum power is allocated over predefined actuation equipment and over predefined accessory equipment among the electrical equipment, the actuation equipment being defined according to a configuration of the crane; and
an optimized mode in which the available maximum power is allocated over the predefined actuation equipment and also over the accessory equipment but according to cutoff conditions associated to the accessory equipment, so that according to their respective cut-off conditions the accessory equipment are powered or not.

9. The management method according to claim 8, wherein the actuation equipment comprise mounting equipment which participate in a mounting of the crane by acting on a displacement of part(s) of the crane when the crane is in a mounting configuration.

10. The management method according to claim 9, wherein the mounting equipment comprise at least one of the following equipment: a hydraulic folding/unfolding unit allowing folding/unfolding of a mast and of a jib, a hydraulic wedging unit allowing to wedge the crane on a ground, a hydraulic orientation unit allowing an orientation of a base of the crane, a bracket hydraulic unit allowing an actuation of a mounting bracket.

11. The management method according to claim 10, wherein the actuation equipment comprise working equipment which participate in displacing a load when the crane is in a working configuration.

12. The management method according to claim 11, wherein the working equipment comprise at least one of the following equipment: a motorized lifting system allowing to lift/lower a load, a motorized distribution system allowing a distribution of a load along a jib, an orientation motorized system allowing an orientation of a jib, a translation motorized system allowing a translation of the crane, a motorized lifting system allowing a lifting of a luffing jib.

13. The management method according to claim 8, wherein the accessory equipment comprise at least one of the following system accessory equipment: a heating system to heat up a space of the crane, a ventilation or cooling system to ventilate/cool down a space of the crane; and
the cutoff conditions depend on at least one environmental parameter that is a physical parameter representative of the space of the crane.

14. The management method according to claim 13, wherein the environmental parameter is an internal temperature of the space of the crane.

15. The management method according to claim 13, wherein the space of the crane is an electrical cabinet internally grouping all or some organs participating in the electrical power supply of the crane, or a cockpit.

16. The management method according to claim 8, wherein the accessory equipment comprise at least one of the following user accessory equipment: a lighting system, an electrical socket; and
the cutoff conditions depend on a selection of a classification performed by a user for the or each of the user accessory equipment, amongst the following classifications:
a "non-essential" classification which corresponds to an authorization not to power the corresponding user accessory equipment in the optimized mode in favor of the actuation equipment; and
an "essential" classification which corresponds to a prohibition not to power the corresponding user accessory equipment in the optimized mode.

17. The management method according to claim 8, wherein, in the optimized mode, the actuation equipment are powered by an actuation power that is equivalent to the available maximum power or to the available maximum power minus an accessory power necessary to power the accessory equipment according to the cutoff conditions,
and this actuation power is allocated over the actuation equipment according to an allocation scheme selected amongst the following two allocation schemes:
a first scheme in which the actuation equipment are sequentially activated and therefore sequentially powered, so that each actuation equipment is powered, when activated, by the actuation power; and
a second scheme in which the actuation equipment are simultaneously activated and therefore simultaneously powered, so that all of the actuation equipment are powered together by the actuation power.

18. The management method according to claim 17, wherein a storage is implemented in a memory to store of a plurality of preferential allocation modes, each preferential allocation mode being associated with percentages of allocation of the actuation power over the different actuation equipment in the second scheme, and the management method implements a selection of a preferential allocation mode to provide an allocation of the actuation power in accordance with said selected preferential allocation mode when the second scheme is selected.

19. The management method according to claim 1, wherein, when the requested general power is non-zero, the following management modes are automatically implemented:
- the autonomous power supply mode is automatically implemented if the primary power supply source is not available;
- the main power supply mode or the mixed recharging/powering mode is automatically implemented according to the charge level of the rechargeable secondary power supply source, if the primary power supply source is available and if the requested general power is lower than the primary power; and
- the hybrid power supply mode is automatically implemented if the primary power supply source is available and if the requested general power is higher than the primary power.

20. The management method according to claim 1, wherein the primary power supply source outputs a single-phase or three-phase type primary power supply voltage, and the conversion circuit ensures a conversion of said primary power supply voltage into a three-phase power supply voltage.

21. A crane comprising actuation equipment defined according to a configuration of the crane and electrical equipment electrically powered, via a conversion circuit, by a primary power supply source capable of providing a primary power and a rechargeable secondary power supply source capable of providing a secondary power, wherein said crane comprises:
- a monitoring unit for monitoring a requested general power which corresponds to a power requested by all the electrical equipment and a charge level of the rechargeable secondary power supply source,
- a control/command unit, connected to the monitoring unit and to the conversion circuit, and configured to implement the management method in accordance with claim 1; and wherein the electrical equipment comprise actuation equipment, and said actuation equipment comprise working equipment which participate in displacing a load when the crane is in a working configuration.

22. The crane according to claim 21, wherein the electrical equipment comprise safety equipment configured to allow the crane to be safe-guarded.

23. The crane according to claim 21, wherein the actuation equipment comprise mounting equipment which participate in a mounting of the crane by acting on a displacement of part(s) of the crane when the crane is in a mounting configuration.

24. The crane according to claim 21, further comprising a user interface connected to the control/command unit to select, in the hybrid power supply mode, in the autonomous power supply mode, in the main power supply mode and in the mixed recharging/powering mode, a management sub-mode amongst several management sub-modes of the management method, wherein the management method implements a selection, in the hybrid power supply mode and in the autonomous power supply mode, of a management sub-mode amongst several management sub-modes comprising at least:
- an automatic sub-mode in which the secondary power is monitored so as to correspond to ka times the secondary maximum power, wherein ka is a coefficient that is less than or equal to 1 and which decreases with the charge level until the charge level drops below a low threshold; and
- an economical sub-mode in which the secondary power is monitored so as to correspond to ke times the secondary maximum power, wherein ke is a coefficient lower than ka and which decreases with the charge level until the charge level drops below a low threshold.

* * * * *